Nov. 10, 1953     E. WEIDES ET AL     2,658,980

ELECTRIC RESISTANCE

Filed March 13, 1951     2 Sheets-Sheet 1

INVENTORS
HELLMUTH-CARL RIEPKA
ERIC. WEIDES
OTTO UEBELMANN

BY
ATTORNEY

Nov. 10, 1953 E. WEIDES ET AL 2,658,980
ELECTRIC RESISTANCE
Filed March 13, 1951 2 Sheets-Sheet 2
Fig.8  Fig.9
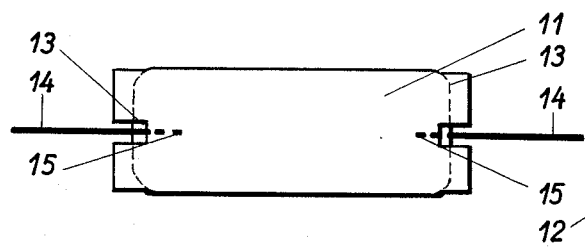
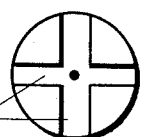
Fig.10  Fig.11  Fig.12
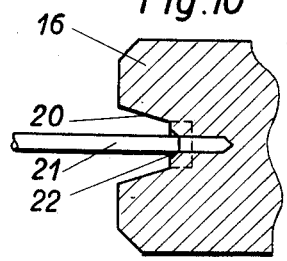
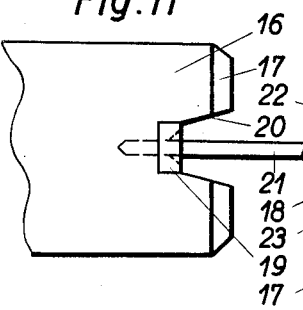
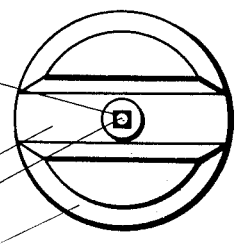
Fig.13  Fig.14
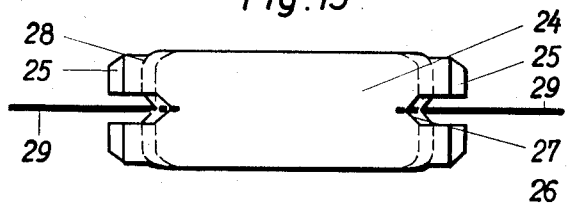
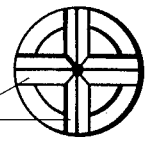
Fig.15  Fig.16  Fig.17
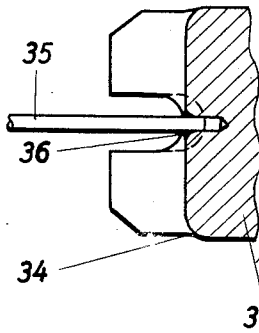
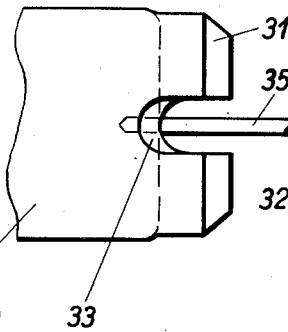
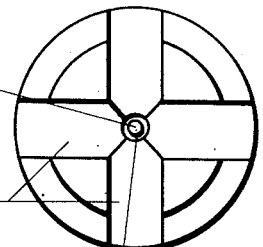
INVENTORS
HELLMUTH-CARL RIEPKA
ERIC WEIDES
OTTO UEBELMANN
BY
ATTORNEY Patented Nov. 10, 1953

2,658,980

UNITED STATES PATENT OFFICE 2,658,980

ELECTRIC RESISTANCE

Erich Weides, Langel, near Porz (Rhine), Hellmuth C. Riepka, Porz (Rhine), and Otto Uebelmann, Langel, near Porz (Rhine), Germany Application March 13, 1951, Serial No. 215,218

Claims priority, application Germany March 16, 1950

1 Claim. (Cl. 201—63)

Our invention relates to electric resistances which comprise a body made of ceramic material such as porcelain, particularly cylindrical porcelain bodies, to the surface of which a layer of carbon or the like is applied, electrically conductive connecting member being attached to both ends of the body and connected, for example by soldering, with the ends of the resistance layer.

It is one object of our invention to provide an electric resistance of this type which can be produced simply and cheaply.

A further object of our invention is a new and improved method of fixing the conductive connecting members to the ends of the electric resistance body.

A further object of the invention is a ceramic body for electric resistances which facilitates the fixing of the current feed members.

A still further object of the invention is a method for the production of carrier bodies, by means of an extrusion press, in the form of a hollow cylinder, which is then sub-divided into individual carriers.

Further objects and advantages of the invention will be apparent from the following description read in conjunction with the accompanying drawings which are given by way of example and in which Fig. 1 is a longitudinal sectional view of one form of resistance according to our invention;

Fig. 8 is a side view and Fig. 9 an end view of a still further form of resistance;

Fig. 10 is a partial sectional view of yet another form of resistance;

Fig. 11 is a partial side view of another form of resistance;

Fig. 12 is an end view of the resistance shown in Fig. 11;

Fig. 13 is a side view of Fig. 14 an end view of still another form of resistance according to our invention;

Fig. 15 is a partial side elevational view, partly in section, of another form of resistance;

Fig. 16 is a partial side elevational view and Fig. 17 an end view of still another form of resistance.

Figure 1:
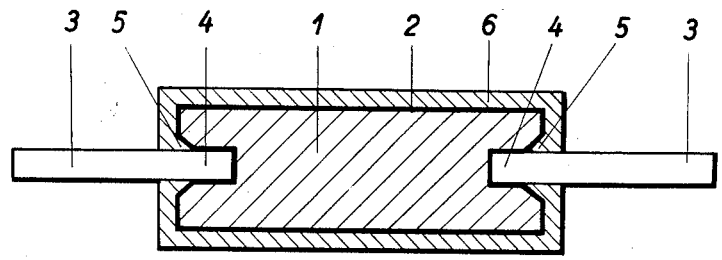

In the resistance shown in Fig. 1, the ceramic carrier body I is completely surrounded by the resistance layer 2 of, for example, carbon or a resistance material bound by varnish or a glaze. The connecting members 3, for example, wires of oxygen-free copper, brass or the like which can also be surface-tinned in order to improve their solderability, are "jumped" into the holes 4 of the carrier body which in their turn are provided with conical recesses 5. The entire resistance comprising body I, the resistance layer 2 and the connecting members 3 may be surrounded by an insulating protective layer 6.

Figure 2:
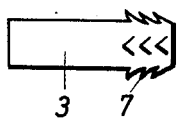
Figs. 2, 3 and 4 are side views of different forms of connecting members.

Fig. 2 shows a single connecting member 3 which is provided with teeth 7 at the end to be connected to the resistance body, in order to produce a secure connection of the connecting member with the resistance body.

Figure 3:
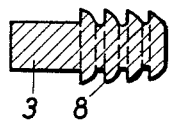

According to Fig. 3 the connecting member is provided with circumferential grooves 8 for the same purpose.

Figure 4:
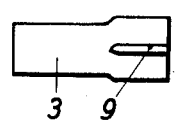

According to Fig. 4 a longitudinal slot 9 is provided in a connecting member 3. Experiments have shown that connecting members jumped into the holes 4 are held with sufficient firmness therein and are fully able to meet the usual tensile strains. The form of connecting members according to Figs. 2 to 4 is therefore not necessary in all cases but only in those cases in which particularly high tensile strains are to be expected. If connecting members with teeth, grooves or recesses are jumped into the holes 4 they are somewhat compressed inside the holes, and in this way are held with a certain grip in the holes 4 and are thus particularly secure mechanically. It is desirable when jumping in the connecting members to use a contact-making agent, for example a graphite solution or the like, in order to ensure a particularly good electrical connection between the resistance layer applied to the carrier and the connecting member.

Figure 5:
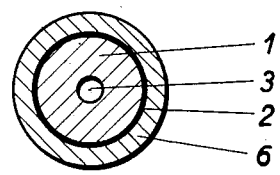
Figs. 5, 6 and 7 are cross-sectional views of further forms of resistance, the sections being taken near one end of the resistance.

The resistance shown in Fig. 5 has a circular ceramic body I into one end of which the connecting member 3 is jumped. The resistance layer 2 is, in this case, completely surrounded by an insulating layer 6 of artificial resin, varnish or the like.

Figure 6:
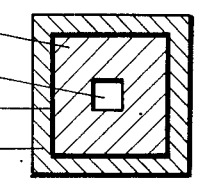

According to Fig. 6 both the carrier body and the connecting member 3 are of square cross section. The resistance layer 2 is coated with an insulating layer 6.

Figure 7:
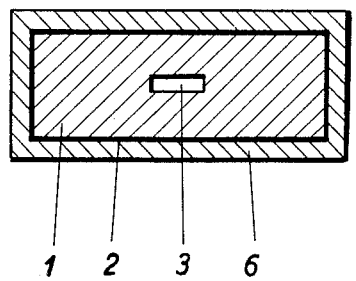

In the resistance shown in Fig. 7, the resistance body 1 and the connecting member 3 are of a flat rectangular section. In this case likewise the resistance layer 2 is provided with an insulating casing 6. The resistance layer 2 can be made and applied on the carrier body in any known way and, if desired, can be adjusted by a mechanical, thermal or chemical treatment to the required resistance value. The resistance layer is applied, not as in the resistances hitherto known to the longitudinal surfaces only, but as mentioned above, is applied on the body on all sides thereof and it therefore also covers the end faces and, partly or completely, the interior of the connecting holes 4. In this way connecting members in the form of caps, rings or a wire helix, are completely dispensed with and the connecting members are far more securely held in the holes than in the resistances hitherto known. The insulating protecting layer 6 can in this case consist of varnish which is applied by brushing on, immersion or spraying. Artificial resin may however also be used, this being pressed round the carrier 1 with the resistance layer 2 as soon as the connecting members 3 are attached to it.

In the embodiments hitherto illustrated the cross section of the axial hole initially is of the same shape and possibly also of the same area as the cross-section of the connecting member. It is however also possible to insert the current-carrying member into axial recesses whose cross-section does not correspond with that of the wire or the like to be jumped in. If for example the cross-section of the central hole is square or star-shaped or polygonal and the cross-section of the current-carrying connecting member is circular, the connecting member, on being jumped in, is deformed cold and its sectional area adapted to that of the axial hole, by which means a very secure grip and a good electric contact is ensured. In addition, the current-carrying connecting members can also be joined to the carrier body by the use of a contact-making agent, as for example a graphite solution, or by means of a conductive cement. Good results are obtained if the cross-section of the wire to be jumped in is say 10–15% less than that of the axial hole.

According to the resistances shown in Figs. 8 to 17, in addition to the central hole in the carrier body, one or more grooves running transversely over the central hole are provided, the depth of which grooves can increase towards the edge of the carrier body, i. e. outwards. In Fig. 8 the resistance body 11 has two grooves 12 which are perpendicular to each other and are deepened at the ends 13. The connecting members 14 are jumped in the manner described above into the central holes 15 which are pressed into the body 11. The grooves 12 produce current-carrying faces between the cylindrical resistance layer and the current lead member which cannot be injured in operation or in use. The bounding edges of the bottom faces of the grooves may be at symmetrical angles, semi-circular or substantially parallel to the end face of the carrier body. The side faces of the grooves 12 may be parallel or at an acute angle to each other. If the contact wires or connecting members are bent perpendicularly in use there also results from the arrangement of the grooves 12 a good protection against twist of the connecting members in the fixing holes and in this way a further improvement of the electric resistance according to the invention. The edges of the end faces of the carrier body and also if need be of the grooves are suitably broken away or bevelled off when formed by pressing, in order to avoid difficulties in manufacture.

According to Fig. 10 which shows an end of a resistance body 16, a single transverse groove 20 with sloping side faces is provided and the current lead member 21 is inserted in the manner described in a central bore with the countersink 22. This figure and the following ones merely show the fixing of the current lead member in the carrier body. It is clear that the latter is, in the manner described above, provided with a resistance layer and if desired also with an insulating covering layer.

Fig. 11 shows an end of a resistance body 16 with bevels 17 for the end face. The groove has sloping side faces 20 and is deepened towards the periphery of the body at 19. The transverse groove has a bottom surface 18, and the central hole 23, owing to the recess 22, forms a good guide for the jumping in of the current lead 21.

According to Fig. 13 the carrier body 24 is provided at its ends with bevels 25 and transverse grooves 26 arranged crosswise, which have bounding edges 27 at symmetrical angles, and greater depth towards the periphery of the carrier body at 28. The current lead members 29 are, in the manner described above, inserted or jumped into the pressed-in central holes of the carrier body 24.

According to Fig. 15, which shows one end of a resistance body according to the invention, the carrier body 30 is provided with transverse grooves the depth of which increases towards the edge at 34. The current lead member 35 is, when being jumped into the central hole, guided by means of the recess 36.

Fig. 16 shows the carrier body 30 with bevels 31 at its end and the bottom faces of the transverse grooves provided with a semi-circular bounding edge 33. From Fig. 17 the vertical arrangement of the transverse grooves 32 and the recess 36 for the central hole may be seen.

Although the resistance layer and an insulating layer can be applied in any way whatsoever it has nevertheless been found particularly advantageous to use as the outer covering layer a non-fibrous tube made, for example, of a polyvinyl chloride, and having great resistance to electric breakdown. This tube is first stretched, slipped on to the resistance and then subjected to a short heat treatment by which it is considerably shrunk, by 30% perhaps, so that it lies tightly over the carrier body. After the tube ends projecting at the end faces have been securely welded to each other or to the carrier body there results in this way an absolutely moisture-tight covering, the breakdown strength of which may amount to up to 2000 volts.

Having fully explained our invention by means of some embodiments it is clear that we do not wish to be restricted to these embodiments and we desire to include within our invention all embodiments falling within the scope of the appended claim.

We claim:

An electrical resistance unit comprising a ceramic carrier body solid in cross section and having a socket at opposite ends thereof, a thin resistance layer covering the outside of said body and the walls of said sockets, current carrying metallic members having portions upset in said sockets respectively thereby to provide rigid connections, and an electrical insulating layer of plastic intimately covering said resistance layer of the body and the ends thereof.

ERICH WEIDES.
     HELLMUTH C. RIEPKA.
     OTTO UEBELMANN.

References Cited in the file of this patent

UNITED STATES PATENTS

| Number | Name | Date |
|---|---|---|
| 1,973,271 | Smith | Sept 11, 1934 |
| 2,111,220 | Megow | Mar. 15, 1938 |
| 2,431,965 | Robbie | Dec. 2, 1947 |
| 2,537,061 | Kohring | Jan. 9, 1951 |

FOREIGN PATENTS

| Number | Country | Date |
|---|---|---|
| 511,398 | Germany | Oct. 29, 1930 |
| 906,769 | France | May 28, 1945 |

OTHER REFERENCES

Electronic Industries, February 1945, page 87.